United States Patent
Maeng

(10) Patent No.: US 12,063,210 B1
(45) Date of Patent: Aug. 13, 2024

(54) SECURE AUTHENTICATION FOR A VIRTUAL COMPUTER

(71) Applicant: Wells Fargo Bank, N.A., San Francisco, CA (US)

(72) Inventor: Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 506 days.

(21) Appl. No.: 17/103,777

(22) Filed: Nov. 24, 2020

(51) Int. Cl.
*H04L 9/40* (2022.01)
*H04L 9/06* (2006.01)
*H04W 12/06* (2021.01)

(52) U.S. Cl.
CPC .......... *H04L 63/083* (2013.01); *H04L 9/0643* (2013.01); *H04L 63/0853* (2013.01); *H04W 12/06* (2013.01)

(58) Field of Classification Search
CPC . H04L 63/083; H04L 9/0643; H04L 63/0853; H04W 12/06
See application file for complete search history.

(56) References Cited

U.S. PATENT DOCUMENTS

| | | | |
|---|---|---|---|
| 8,560,820 B2 * | 10/2013 | de Cesare | H04N 21/4432 713/168 |
| 9,172,724 B1 | 10/2015 | Reddy et al. | |
| 9,300,640 B2 | 3/2016 | Pate | |
| 9,397,990 B1 * | 7/2016 | Taly | H04L 63/08 |
| 10,230,725 B2 | 3/2019 | Peterson et al. | |
| 10,757,569 B2 * | 8/2020 | Wang | H04W 12/02 |
| 2007/0300220 A1 * | 12/2007 | Seliger | H04L 63/0272 718/1 |
| 2010/0223475 A1 * | 9/2010 | MacFarlane | G06F 21/602 713/189 |
| 2012/0066748 A1 * | 3/2012 | Vimpari | H04L 63/105 726/6 |
| 2015/0073992 A1 * | 3/2015 | Weiner | G06Q 20/3278 705/44 |
| 2016/0012465 A1 * | 1/2016 | Sharp | G06Q 20/321 705/14.17 |

(Continued)

OTHER PUBLICATIONS

Otoo, "Two-factor authentication in cloud computing: using kerberos with one-time password via SMS", Kwame Nkrumah University of Science and Technology, Nov. 2014, 88 pp.

(Continued)

*Primary Examiner* — Abiy Getachew
*Assistant Examiner* — Afaq Ali
(74) *Attorney, Agent, or Firm* — Shumaker & Sieffert, P. A.

(57) ABSTRACT

A computing device may generate a hash value based at least in part on user credentials for accessing an internal network, a security code generated by a security token, and at least a portion of program code of a virtual computing application for accessing the internal network. The computing device may send, using a first communications channel, an indication of the hash value to a computing system associated with the internal network. The computing device may, in response to sending the hash value, receive, via a second communications channel, a first indication of a passcode from the computing system. The computing device may, in response to receiving the passcode, send a second indication of the passcode to the computing system.

20 Claims, 6 Drawing Sheets

(56) References Cited

U.S. PATENT DOCUMENTS

| | | | |
|---|---|---|---|
| 2018/0007059 A1 | 1/2018 | Innes et al. | |
| 2018/0144122 A1* | 5/2018 | Dymond | G06F 21/41 |
| 2020/0162910 A1 | 5/2020 | Masure et al. | |
| 2020/0296112 A1* | 9/2020 | Namboodiri | G06F 21/44 |
| 2021/0021407 A1* | 1/2021 | Weerasinghe | H04L 9/3239 |
| 2021/0044976 A1* | 2/2021 | Avetisov | H04L 9/321 |
| 2021/0067526 A1* | 3/2021 | Fahrny | H04L 63/1416 |
| 2021/0209012 A1* | 7/2021 | Umberhocker | H04L 9/3239 |
| 2022/0043926 A1* | 2/2022 | Saad | H04L 63/083 |
| 2022/0067704 A1* | 3/2022 | Yoo | H04L 9/3234 |
| 2023/0060782 A1* | 3/2023 | Wang | G06F 21/57 |

OTHER PUBLICATIONS

Gilad et al., "Securing Smartphones: A Micro-TCB Approach", Jan. 29, 2014, 11 pp.

* cited by examiner

SECURE AUTHENTICATION FOR A VIRTUAL COMPUTER

TECHNICAL FIELD

The invention relates to techniques for authenticating a virtual computer application with a computing system.

BACKGROUND

An organization such as a company, institution, or government entity may enable employees and other users associated with the organization to remotely connect to the organization's internal computer network to access resources such as e-mails, documents, and applications within the internal computer network. The organization's internal computer network may implement security policies that require a user of a computing device to be authenticated in order to grant the user's computing device access to the computer network. For example, an organization's internal computer network may implement a security policy that requires a user to input user credentials such as a username and a password at a computing device that is attempting to access the organization's internal computer network. The internal computer network may receive the user credentials from the user's computing device and may validate the user credentials to determine whether to grant the user's computing device access to resources in the internal computer network.

SUMMARY

In general, this disclosure describes techniques for secure authentication of users to access an organization's computer network. A computing device may execute a virtual computer application that communicates with the organization's computer network to provide access to resources in the organization's computer network, and a user of the computing device may be required to authenticate with the organization's computer network in order to be able to use the virtual computer application to gain access to the resources in the organization's computer network.

While authenticating a user using user credentials, such as a username and a password, is a long-established authentication technique, authenticating a user using only user credentials may not provide an adequate level of security for the purposes of accessing an organization's computer network, which may contain sensitive information such as financial data, employee records, trade secrets, and the like. For example, it may be possible for a malicious actor to gain unauthorized access to a user's user credentials via techniques such as hacking, cracking, phishing, social engineering, and the like. Furthermore, only authenticating user credentials of a user without also authenticating the computing device and the virtual computer application used by the user may enable malicious actors to compromise the computing device and/or virtual computer application, such as via insertion of malicious code in the virtual computer application.

As such, in accordance with aspects of the present disclosure, instead of using only user credentials such as a username and a password to authenticate a virtual application with an organization's computer network, the techniques described in this disclosure use a combination of user credentials, a security code generated by a security token, as well as the program code of the virtual computer application itself to authenticate the virtual computer application with the organization's computer network. For example, a computing device may compute a hash value based on such a combination of user credentials, the security code generated by a security token, as well as the program code of the virtual computer application and may send the hash value for authentication to the organization's computer network.

If the organization's computer network successfully authenticates the hash value, the organization's computer network may perform multi-factor authentication by sending a passcode to the computing device via a different communications channel than was used by the computing device to transmit the hash value. The virtual computing application may, in response to receiving the passcode, send the passcode back to the computer network via the same communications channel used to transmit the passcode to the computing device. If the computer network determines that the passcode received from the computing device matches the passcode that was sent to the computing device, the computer network may grant the user of the virtual computing application access to resources in the computer network.

The techniques described herein may provide one or more technical advantages. For example, by using a combination of user credentials, an authentication code generated by a security token, as well as the program code of the virtual computer application itself to authenticate the virtual computer application along with the use of multi-factor authentication, the techniques described herein increase the level of security of an organization's computer network and make it more difficult for unauthorized users to be able to gain access to the computer network by determining not just whether the user is an authorized user of the computer network but by also determining that the computing device and the virtual computer application have not been compromised by malicious actors.

In one aspect, a method includes generating, by a computing device, a hash value based at least in part on user credentials for accessing an internal network, a security code generated by a security token, and at least a portion of program code of a virtual computing application for accessing the internal network. The method further includes sending, by the computing device and using a first communications channel, an indication of the hash value to a computing system associated with the internal network. The method further includes in response to sending the hash value, receiving, by the computing device and via a second communications channel, a first indication of a passcode from the computing system. The method further includes in response to receiving the passcode, sending, by the computing device, a second indication of the passcode to the computing system.

In another aspect, a computing device includes memory. The computing device further includes one or more processors in communication with the memory and configured to: generate a hash value based at least in part on user credentials for accessing an internal network, a security code generated by a security token, and at least a portion of program code of a virtual computing application for accessing the internal network; send, using a first communications channel, an indication of the hash value to a computing system associated with the internal network; in response to sending the hash value, receive, via a second communications channel, a first indication of a passcode from the computing system; and in response to receiving the passcode, send a second indication of the passcode to the computing system.

In another aspect, a non-transitory computer-readable storage medium storing instructions that, when executed, cause one or more processors of a computing device to: generate a hash value based at least in part on user credentials for accessing an internal network, a security code generated by a security token, and at least a portion of program code of a virtual computing application for accessing the internal network; send, using a first communications channel, an indication of the hash value to a computing system associated with the internal network; in response to sending the hash value, receive, via a second communications channel, a first indication of a passcode from the computing system; and in response to receiving the passcode, send a second indication of the passcode to the computing system.

In another aspect, a method includes receiving, by a computing system associated with an internal network via a first communications channel, an indication of a hash value generated by a computing device. The method further includes determining, by a computing system, a valid hash value based at least in part on user credentials for accessing the internal network, a security code generated by a security token, and at least a portion of program code of a virtual computing application for accessing the internal network. The method further includes comparing, by the computing system, the valid hash value with the hash value to determine whether the hash value matches the valid hash value. The method further includes in response to determining that the hash value matches the valid hash value, sending, by the computing system via a second communications channel, a first indication of a passcode to the computing device. The method further includes in response to receiving a second indication of the passcode from the computing device, granting, by the computing system to the computing device, access to the internal network.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
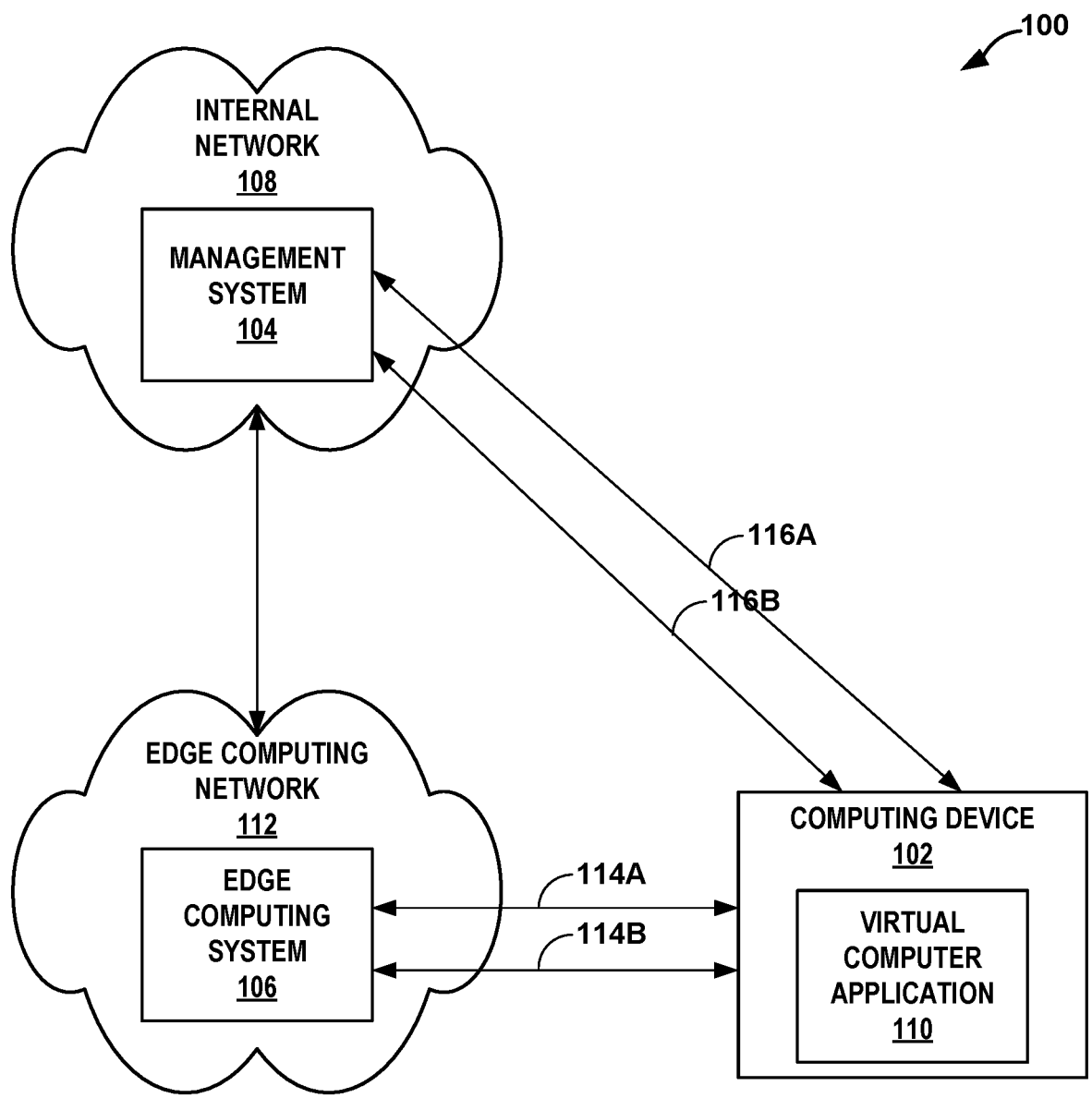
FIG. 1 is a conceptual diagram illustrating a system for secure authentication of users to access an organization's internal computer network, in accordance with aspects of the present disclosure.

FIG. 1 is a conceptual diagram illustrating a system for secure authentication of users to access an organization's internal computer network, in accordance with aspects of the present disclosure. As shown in FIG. 1, system 100 includes computing device 102 that may communicate with internal network 108 to access resources in internal network 108. Computing device 102 may include smart phones, tablets, laptop computers, desktop computers, adaptors for smart phones, wireless hubs, routers, and the like that may communicate over one or more networks with internal network 108. In some examples, computing devices 102 may be connected or otherwise operably coupled to peripherals or other endpoint devices (not shown) that may communicate with computing device 102 to, for example, act as input and/or output devices for computing device 102 or to access internal network 108 via computing device 102.

Internal network 108 may be a private computer network contained within an organization or enterprise, such as companies, schools, government entities, and the like, for securely sharing company information and resources such as computing devices, documents, software applications, and the like, among members of the organization. In some examples, internal network 108 may be implemented as a centralized or distributed network of computing devices and systems.

Internal network 108 may include, amongst the resources of internal network 108, management system 104 that includes one or more computing devices, servers, and the like for managing access to internal network 108. For example, management system 104 may operate to authenticate computing devices, such as computing device 102, that attempt to access internal network 108 to determine whether to grant or deny access to internal network 108.

In some examples, internal network 108 may use edge computing technology to bring computing resources closer to remote users of internal network 108. For example, internal network 108 may communicate with edge computing network 112 via networks such as the Internet to utilize edge computing network 112 that is physically located closer to computing device 102 compared with internal network 108 to communicate with computing device 102. For example, edge computing network 112 may be cellular communications infrastructure, such as a 5G network backbone that contains edge computing system 106 at the edge of edge computing network 112 that is physically close to computing device 102 to communicate with computing device 102, such as via a cellular network (e.g., a 5G wireless network).

Similar to management system 104, edge computing system 106 may include one or more computing devices, servers, and the like that operate to authenticate computing devices, such as computing device 102, that attempt to access internal network 108 to determine whether to grant or deny access to internal network 108. If edge computing system 106 successfully authenticates a computing device to grant the computing device access to internal network 108, edge computing system 106 may communicate with management system 104 to transmit, to management system 104, the details of the computing device that has been granted access to internal network 108.

Computing device 102 may include virtual computer application 110 that executes on computing device 102 for connecting to internal network 108 and to access organizational resources of internal network 108. Virtual computer application 110 may be executable program code, such as a software application, kernel extensions, libraries, operating system-level software, and the like that computing device 102 may execute to communicate and connect with internal network 108.

Virtual computer application 110 may execute at computing device 102 to provide remote access functionality for users to access resources in internal network 108. For example, virtual computer application 110 may execute to provide remote desktop functionality, virtual desktop functionality, virtual private network (VPN) functionality, and the like to enable users of virtual computer application 110 to access and interact with resources in internal network 108. For example, virtual computer application 110 may provide functionality, such as in the form of a graphical user interface (GUI), for users to read and write certain files in internal network 108, execute certain applications in internal network 108, access certain computer systems in internal network 108, and the like.

To access internal network 108 using virtual computer application 110, a user of computing device 102 may provide user input that corresponds to user credentials, such as a username and password, biometric data associated with biometric features of a user, such as a fingerprint or facial features of the user, and the like. For example, a user of computing device 102 may type in a username and password, provide a fingerprint at a fingerprint reader operably coupled to computing device 102, allow the user's face to be scanned by a facial recognition system operably coupled to computing device 102, and the like.

To provide additional security to internal network 108, computing device 102 may also use a security token to generate a security code that is used together with the user credentials to authenticate the user and computing device 102. A security token may be a hardware token, such as a physical key fob or other hardware device operably coupled to computing device 102 via a bus, port, and the like, or a software token, such as a soft token of other software that executes on computing device 102, that periodically (e.g., every 60 seconds) generates a new security code, such as a string of numbers, characters, and the like. To generate the security code, the security token may use on a seed, which may be different for each security token and which may be encoded in the security token, along with a timestamp.

To further provide additional security to internal network 108, computing device 102, the program code of virtual computer application 110 may also be used along with the user credentials and the security code generated by the security token to authenticate virtual computer application 110. The program code of virtual computer application 110 may be code that executes at computing device 102 to provide remote access functionality for users to access resources in internal network 108, and the program code of virtual computer application 110 may be authenticated to, for example, determine whether malicious code may have been inserted into virtual computer application 110.

In some examples, virtual computer application 110 may be organized according to an executable file format, such as a Portable Executable (PE) file format, an Executable and Linkable Format (ELF), a Mach object (Mach-O) file format, an a.out file format, and the like that includes executable code. The program code of virtual computer application 110 may be the executable code of virtual computer application 110. For example, if virtual computer application 110 is organized according to the PE file format, the portion of the program code of virtual computer application used to authenticate with organization network 108 may include portions of the .text section that includes executable code of virtual computer application 110.

In some examples, the program code of virtual computer application 110 may include portions of virtual computer application 110 such as headers of virtual computer application 110, sections of virtual computer application 110, tables (e.g., import tables) of virtual computer application 110, resources included in virtual computer application 110. For example, the program code of virtual computer application 110 may include a combination of executable code of virtual computer application 110 and one or more of such headers, tables, sections, resources, and the like in virtual computer application 110.

In some examples, computing device 102 may determine the portion of the program code of virtual computer application 110 to be hashed based on various factors such as location, time, and the like. For example, computing device 102 may use the current location of computing device 102, the current time, and the like, as a seed or other factor to determine a random portion of virtual computer application 110 to be hashed.

Computing device 102 may generate a hash value based at least in part on the user credentials, the security code, and at least a portion of the program code of virtual computer application 110. For example, computing device 102 may hash the user credentials (e.g., a password and/or username), the authentication code, and at least the portion of the program code of virtual computer application 110 using any suitable hashing function or hashing technique to generate a hash value.

In some examples, generating a hash value may include generating a plurality of hash values. That is, computing device 102 may hash the user credentials, the security code, and at least the portion of the program code of virtual computer application 110 via any suitable hashing function or hashing technique to generate a plurality of hash values. For example, computing device 102 may hash the user credentials to generate a hash value associated with the credentials, hash the authentication code to generate a hash value associated with the authentication code, and hash at least the portion of the program code of virtual computer application 110 to generate a hash value associated with at least the portion of the program code of virtual computer application 110.

Computing device 102 may encrypt the generated hash value (or plurality of hash values) using any suitable technique, such as by using a cryptographic key. For example, computing device 102 may use the techniques of public-key cryptography to encrypt the generated hash value or hash values using a public key, such the resulting encrypted hash value can only be decrypted using a private key that corresponds to the public key. If computing device 102 generates a plurality of hash values, computing device 102 may encrypt each of the plurality of hash values using any suitable technique, as described above.

Computing device 102 may, in response to encrypting the hash value, send an indication of the encrypted hash value to internal network 108 via a communications channel. In some examples, if computing device 102 communicates directly with internal network 108, computing device 102 may send an indication of the encrypted hash value via communications channel 116A to management system 104. In some examples, if internal network 108 uses edge computing network 112 to communicate with computing device 102, computing device 102 may send an indication the encrypted hash value via communications channel 114A to edge computing system 106.

Computing device 102 may also send, along with the indication of the encrypted hash value, other information associated with the hash value to management system 104 or edge computing system 106. In some examples, computing device 102 may send an indication of the username of the user whose user credentials were hashed in the encrypted hash value. In some examples, because the security code generated by the security token may be dependent on the time at which the security code was generated by the security token, computing device 102 may also send an indication of a timestamp associated with the security code to management system 104 or edge computing system 106, where the timestamp may indicate the time at which the security code was generated. In some examples, computing device 102 may also send additional information such as the location of computing device 102 or the timestamp used as a seed to determine the portion of the program code of virtual computer application 110 that is to be hashed.

Management server system 104 of internal network 108 may receive the encrypted hash value as well as any additional information from computing device 102 via communications channel 116A. If internal network 108 uses edge computing network 112 to communicate with computing device 102, edge computing system 106 may receive the encrypted hash value from computing device 102 via communications channel 114A.

Management server system 104 or edge computing system 106 may, in response to receiving the encrypted hash value and the additional information, decrypt the encrypted hash value to generate a decrypted hash value and validate the decrypted hash value. For example, as discussed above, if the hash value is encrypted using a public key, management server system 104 or edge computing system 106 may decrypt the encrypted hash value using a private key that corresponds to the public key used to encrypt the hash value. If management server system 104 or edge computing system 106 receives a plurality of encrypted hash values, such as an encrypted hash value resulting from hashing the user credentials, an encrypted hash value resulting from hashing the security code generated by a security token, and an encrypted hash value resulting from hashing at least a portion of the program code of virtual computer application 110, management server system 104 or edge computing system 106 may decrypt each of the plurality of encrypted hash values.

To validate the hash value sent by virtual computer application 110, management server system 104 or edge computing system 106 may calculate a valid hash value and compare the valid hash value with the decrypted hash value received from virtual computer application 110. If the valid hash value calculated by management server system 104 or edge computing system 106 matches (e.g., is identical to) the decrypted hash value, then management server system 104 or edge computing system 106 may determine that the decrypted hash value is valid.

To calculate a valid hash value that is to be compared with the decrypted hash value, management server system 104 or edge computing system 106 may determine the user credentials of the user that is using computing device 102 to access internal network 108, the security code associated with the timestamp at which computing device 102 generated the security code, and the portion of the program code of a virtual computer application that corresponds to the portion of the program code of virtual computer application 110 that was hashed by computing device 102. To determine the user credentials of the user that is using computing device 102 to access internal network 108, management server system 104 or edge computing system 106 may use the username received from computing device 102 to look up the user credential of an authorized user of internal network 108 having the specified username.

In some examples, to determine the security code, management server system 104 or edge computing system 106 may generate a security code based on the timestamp associated with the security code generated by computing device 102. Because management server system 104 or edge computing system 106 may have access or may otherwise be able to determine the random seed used by the security token at computing device 102 to generate a security code, management server system 104 or edge computing system 106 may be able to generate a security code based on the timestamp associated with the security code generated by computing device 102 and the same random seed used by the security token at computing device 102 to generate a security code.

To determine the portion of the program code of a virtual computer application that corresponds to the portion of the program code of virtual computer application 110 that was hashed by computing device 102, management server system 104 or edge computing system 106 may, for example, use the location of computing device 102 or the timestamp used as a seed to determine the portion of the program code of the virtual computer application.

Management server system 104 or edge computing system 106 may therefore hash the user credentials of the user that is using computing device 102 to access internal network 108, the security code generated based on the timestamp associated with the security code generated by computing device 102, and the portion of the program code of the virtual computer application to generate a valid hash value.

In some examples, management server system 104 or edge computing system 106 may generate separate valid hash values associated with the user credentials of the user that is using computing device 102 to access internal network 108, the security code generated based on the timestamp associated with the security code generated by computing device 102, and the portion of the program code of the virtual computer application. To that end, management server system 104 or edge computing system 106 may hash the user credentials of the user that is using computing device 102 to access internal network 108 to generate a valid hash value, hash the security code generated based on the timestamp associated with the security code generated by computing device 102 to generate a valid hash value, and hash the portion of the program code of the virtual computer application to generate a valid hash value.

Management server system 104 or edge computing system 106 may compare the generated valid hash value with the decrypted hash value from computing device 102 to determine if the one or more hash values calculated by management server system 104 or edge computing system 106 are identical to the one or more decrypted hash value. If each of the one or more hash valid values calculated by management server system 104 or edge computing system 106 match (e.g. are identical to) the one or more decrypted hash value from computing device 102, management server system 104 or edge computing system 106 may determine that the hash value generated by computing device 102 is valid.

As such, if the decrypted hash value is a hash value generated by hashing together the user credentials of the user that is using computing device 102 to access internal network 108, the security code associated with the timestamp at which computing device 102 generated the security code, and the portion of the program code of virtual computer application 110, management server system 104 or edge computing system 106 may compare the decrypted hash value with the valid hash value generated by management server system 104 or edge computing system 106 hashing together the user credentials of the user that is using computing device 102 to access internal network 108, the security code associated with the timestamp at which computing device 102 generated the security code, and the portion of the portion of the program code of a virtual computer application that corresponds to the portion of the program code of virtual computer application 110 that was hashed by computing device 102.

On the other hand, if the decrypted hash value includes a hash value generated by hashing the user credentials of the user, a hash value generated by hashing the security code, and a hash value generated by hashing the portion of the program code of the virtual computer application 110, management server system 104 or edge computing system 106 may compare the hash value generated by hashing the user credentials of the user with the valid hash value generated by management server system 104 or edge computing system 106 from hashing the user credentials of the user, compare the hash value generated by hashing the security code with the valid hash value generated by management server system 104 or edge computing system 106 from hashing the security code, and compare the hash value generated by hashing the portion of the program code of the virtual computer application 110 with the valid hash value generated by management server system 104 or edge computing system 106 from hashing the portion of the program code of the virtual computer application.

Management server system 104 or edge computing system 106 may, in response to determining that the hash value generated by computing device 102 and sent in encrypted form to management server system 104 or edge computing system 106 is valid, perform multi-factor authentication of computing device 102 by sending an indication of a passcode to virtual computer application 110 of computing device 102 via a communications channel different from the communication channel that transmitted the encrypted hash value to management server system 104 or edge computing system 106. That is, if management server system 104 received the indication of the encrypted hash value from computing device 102 via communications channel 116A, management server system 104 may send the passcode to computing device 102 via communications channel 116B. Similarly, if edge computing system 106 received the indication of the encrypted hash value from computing device 102 via communications channel 114A, management server system 104 may send the passcode to computing device 102 via communications channel 114B.

For example, if communications channels 114A and 116A are Internet, communication channels 114B and 116B may be communication channels in a cellular network, such as the communications channel used by a cellular network to send and receive Short Message Service (SMS) messages and Multimedia Message Service (SMS) messages. In another example, if communications channels 114A and 116A are WiFi channels that carry data via the Internet, communications channels 114B and 116B may be cellular radio channels that carry data via the Internet.

In some examples, management server system 104 or edge computing system 106 may encrypt the passcode and send an indication of the encrypted passcode to computing device 102. For example, management server system 104 or edge computing system 106 may encrypt the passcode using a cryptographic key, such as a public key to encrypt the passcode.

Computing device 102 may receive the indication of the passcode via communications channel 114B or 116B. Computing device 102 may, in response to receiving the indication of the passcode, send, without user intervention, an indication of the passcode back to management server system 104 or edge computing system 106 via communications channels 114A or communication channels 116B. That is, if computing device 102 receives an indication of the passcode from edge computing system 106 via communications channel 114B, computing device 102 may send an indication of the passcode back to edge computing system 106 via communication channel 114A and not via communications channel 114B. Similarly, if computing device 102 receives an indication of the passcode from management server system 104 via communications channel 116B, computing device 102 may send an indication of the passcode back to management server system 104 via communication channel 116A and not via communications channel 116B.

If computing device 102 receives an encrypted passcode, computing device 102 may decrypt the encrypted passcode using a cryptographic key. For example, if the passcode is encrypted using a public key, computing device 102 may decrypt the encrypted passcode using a corresponding private key.

Computing device 102 may, in response to receiving the indication of the passcode, send, without user intervention, an indication of the passcode back to management server system 104 or edge computing system 106. That is, computing device 102 may send an indication of a passcode back to management server system 104 or edge computing system 106 via upon receiving an indication of the passcode without receiving or having to receive user input that causes computing device 102 to send an indication of a passcode back to management server system 104 or edge computing system 106.

Management server system 104 or edge computing system 106 may receive an indication of the passcode from computing device 102 and may, in response, validate the passcode received from computing device 102 by determining whether the passcode received from computing device 102 matches the passcode sent from management server system 104 or edge computing system 106 to computing device 102. For example, management server system 104 or edge computing system 106 may determine whether the passcode received from computing device 102 matches the passcode sent from management server system 104 or edge computing system 106 to computing device 102 by determining whether the value of the passcode received from computing device 102 is the same as the value of the passcode sent from management server system 104 or edge computing system 106 to computing device 102.

If management server system 104 or edge computing system 106 determines that the passcode received from computing device 102 matches the passcode sent from management server system 104 or edge computing system 106 to computing device 102, management server system 104 or edge computing system 106 may grant computing device 102 access to resources in internal network 108. For example, management server system 104 or edge computing system 106 may send to computing device 102 an indication that virtual computing application 110 is authorized to access resources in internal network 108, and virtual computing application 110 may execute at computing device 102 to communicate with management server system 104 or edge computing system 106 to access resources in internal network 108. When management server system 104 and/or edge computing system 106 receives subsequent requests and/or commands from computing device 102 to access resources in internal network 108, management server 104 and/or edge computing system 106 may grant computing device 102 access to such resources based on computing device 102 being authorized to access internal network 108.

Figure 2:
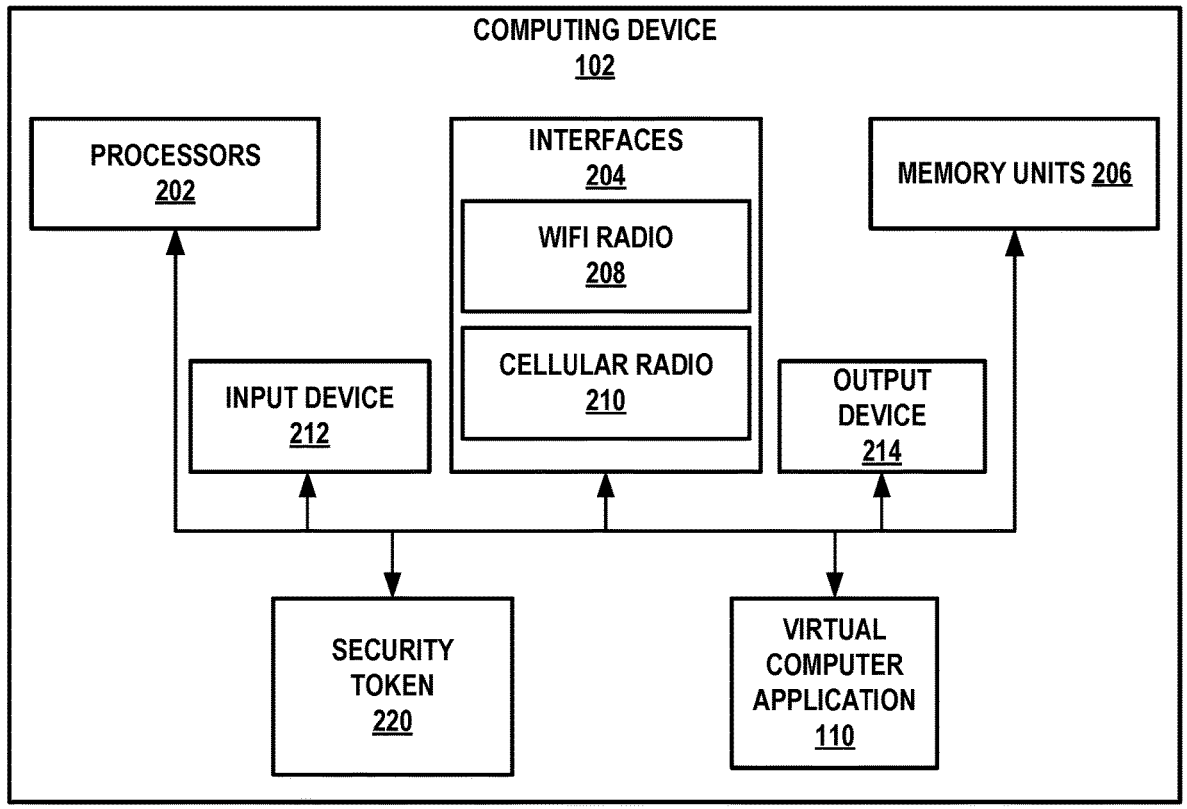
FIG. 2 is a block diagram illustrating an example computing device of FIG. 1 that includes virtual computer application, in accordance with the techniques of this disclosure.

FIG. 2 is a block diagram illustrating an example computing device 102 of FIG. 1 that includes virtual computer application 110 in accordance with the techniques of this disclosure. The architecture of computing device 102 illustrated in FIG. 2 is shown for exemplary purposes only. Computing device 102 should not be limited to the illustrated example architecture. In other examples, computing device 102 may be configured in a variety of ways. For instance, although computing device 102 is illustrated in a single computing device in the example of FIG. 2, in other examples, functional units may be executed on a centralized or distributed network of computing devices.

As shown in the example of FIG. 2, computing device 102 includes one or more processors 202, one or more interfaces 204, one or more memory units 206, input device 212, and output device 214. Computing device 102 also includes virtual computer application 110 and security token 220, which may be implemented as program instructions and/or data stored in memory units 206 and executable by processors 202 or implemented as one or more hardware units or devices of computing device 102. Memory units 206 of computing device 102 may also store an operating system (not shown) executable by processors 202 to control the operation of components of computing device 102. The components, units or modules of computing device 102 are coupled (physically, communicatively, and/or operatively) using communication channels for inter-component communications. In some examples, the communication channels may include a system bus, a network connection, an inter-process communication data structure, or any other method for communicating data.

Processors 202, in one example, may comprise one or more processors that are configured to implement functionality and/or process instructions for execution within computing device 102. For example, processors 202 may be capable of processing instructions stored by memory units 206. Processors 202 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory units 206 may be configured to store information within computing device 30 during operation. Memory units 206 may include a computer-readable storage medium or computer-readable storage device. In some examples, memory units 206 include one or more of a short-term memory or a long-term memory. Memory units 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory units 206 are used to store program instructions for execution by processors 202. Memory units 206 may be used by software or applications running on computing device 102 (e.g., virtual computer application 110) to temporarily store information during program execution.

Input device 212 of computing device 102 may be configured to receive input, such as from users of computing device 102. Examples of input are tactile, audio, and video input. Input device 212 of computing device 102, in one example, includes a presence-sensitive display, touch-sensitive screen, mouse, keyboard, voice responsive system, video camera, microphone or any other type of device for detecting input from a human or machine.

Output device 214 of computing device 102 may be configured to generate output. Examples of output are tactile, audio, and video output. Output device 214 of computing device 102, in one example, includes a presence-sensitive display, sound card, video graphics adapter card, speaker, cathode ray tube (CRT) monitor, liquid crystal display (LCD), or any other type of device for generating output to a human or machine.

Computing device 110 may utilize interfaces 204 to communicate with external devices via one or more networks. Interfaces 204 may be network interfaces, such as Ethernet interfaces, optical transceivers, radio frequency (RF) transceivers, or any other type of devices that can send and receive information. Other examples of such network interfaces may include Wi-Fi or Bluetooth radios. In some examples, computing device 102 utilizes interfaces 204 to wirelessly communicate with external devices. For example, interfaces 204 may include WiFi radio 208 and cellular radio 210, so what computing device 102 may connect to and communicate with external computing devices over WiFi using WiFi radio 208 and may also connect to and communicate with external computing devices by connecting to a cellular data network (e.g., a 5G network) using cellular radio 210.

According to the disclosed techniques, processors 202 may execute virtual computing application 110 to connect to internal network 108 to access resources in internal network 108. Virtual computing application 110 may provide functionality such as VPN functionality, remote desktop functionality, and the like that enables users of computing device 102 to access resources in internal network 108 as though computing device 102 is situated within internal network 108.

In order to gain access to internal network 108, virtual computing application 110 may execute to authenticate with internal network 108. To authenticate with internal network 108, virtual computer application 110 may generate a hash value based on user credentials associated with the user that is using computing device 102, a security code generated by security token 220, and a portion of the program code of virtual computer application 110.

Virtual computer application 110 may receive the user credentials of the user, such as the username and password of the user, by receiving, at input device 212, user input that corresponds to the user credentials of the user. For example, a user may interact with input device 212, such as by typing on a keyboard provided by input device 212, to provide user input that corresponds to the username and password of the user. In some examples, computing device 102 may be operably coupled to peripherals or other endpoint devices and may receive an indication of the user credentials of the user from the peripherals or other endpoint devices that are connected to computing device 102.

Security token 220 may be a hardware token, such as a hardware device operably coupled to computing device 102 or a hardware component of computing device 102, or a software token, such as software that executes on computing device 102, that periodically generates a new security code, such as a string of numbers, characters, and the like. Security token 220 may generate a security code based on a seed, which may be different for each security token, and which may be encoded in the security token, and a timestamp.

Virtual computer application 110 may hash the user credentials associated with the user that is using computing device 102, the security code generated by security token 220, and a portion of the program code of virtual computer application 110 to generate a hash value. In some examples, virtual computer application 110 may separately hash the user credentials to generate a hash value associated with the user credentials, hash the security code to generate a hash value associated with the security code, and hash a portion of the program code of virtual computer application 110 to generate a hash value associated with virtual computer application 110. Virtual computer application 110 may therefore encrypt the one or more hash values, such as by using a cryptographic key, and may send an indication of the one or more encrypted hash values to management system 104 or edge computing system 106 to authenticate virtual computer application 110.

Virtual computer application 110 may send an indication of the one or more encrypted hash values to management system 104 or edge computing system 106 via one of the interfaces 204 of computing device 102. For example, virtual computer application 110 may wirelessly send an indication of the one or more encrypted hash values to management system 104 or edge computing system 106 over the Internet via WiFi radio 208.

If the one or more hash values generated by virtual computer application 110 are determined by management system 104 or edge computing system 106 to be valid, virtual computer application 110 may, in response to sending an indication of the one or more encrypted hash values to management system 104 or edge computing system 106, receive an indication of a passcode from management system 104 or edge computing system 106.

Virtual computing application 110 may receive the indication of the passcode via a different communication channel than was used to send an indication of the one or more encrypted hash values to management system 104 or edge computing system 106. That is, virtual computing application 110 may receive the indication of the passcode via a different interface in interfaces 204 than was used to send an indication of the one or more encrypted hash values. For example, if virtual computing application 110 sent the indication of the one or more encrypted hash values to management system 104 or edge computing system 106 over the Internet via WiFi radio 208, virtual computing application 110 may receive, via cellular radio 210, an indication of the passcode sent over a cellular network.

As such, virtual computing device 110 may be operable to communicate via multiple network interfaces, such as multiple radios, in order to communicate with external computing devices such as management system 104 or edge computing system 106. For example, virtual computing device 110 may use interfaces 204 to communicate using multiple different communications protocols, such as both the Internet and a cellular network, as well as use WiFi radio 208 and cellular radio 210 to be able to communicate via WiFi as well as via cellular data networks. For example, virtual computing application 110 may be able to send an encrypted hash value over the Internet using WiFi radio 208 while also being able to receive, via cellular radio 210, an SMS or MMS from management system 104 or edge computing system 106 that includes an indication of the passcode.

Virtual computing application 110 may, in response to receiving the indication of the passcode, send an indication of the received passcode back to management system 104 or edge computing system 106. In some examples, virtual computing application 110 may, in response to receiving the indication of the passcode, automatically send an indication of the received passcode back to management system 104 or edge computing system 106. That is, upon receiving an indication of the passcode, virtual computing application 110 may send an indication of the received passcode back to management system 104 or edge computing system 106 without receiving user input at input device 212 that directs virtual computing application 110 to send the indication of the received passcode back to management system 104 or edge computing system 106.

If management system 104 or edge computing system 106 successfully authenticates virtual computing application 110 and grants virtual computing application 110 access to internal network 108, virtual computer application 110 may, in response to sending the received passcode back to management system 104 or edge computing system 106, receive an indication that virtual computing application 110 has been granted access to internal network 108. Virtual computing application 110 may therefore execute to present a remote desktop or other functionalities that a user of computing device 102 may use to access resources in internal network 108.

Figure 3:
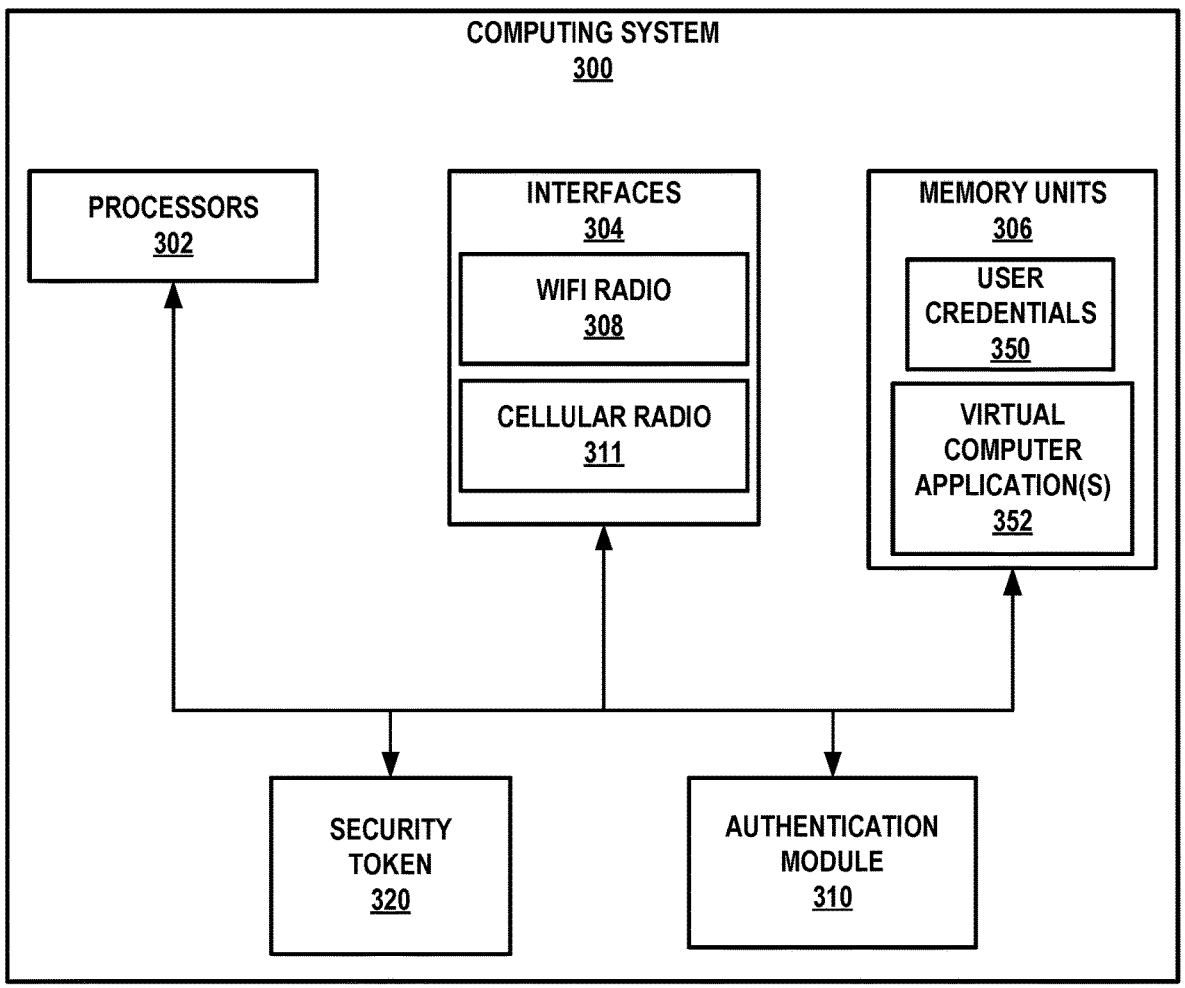
FIG. 3 is a block diagram illustrating an example computing system in accordance with the techniques of this disclosure.

FIG. 3 is a block diagram illustrating an example computing system 300 in accordance with the techniques of this disclosure. Computing system 300 may be an example of management system 104 or edge computing system 106 shown in FIG. 1.

The architecture of computing system 300 illustrated in FIG. 3 is shown for exemplary purposes only. Computing system 300 should not be limited to the illustrated example architecture. In other examples, computing system 300 may be configured in a variety of ways. For instance, although computing system 300 is illustrated in a single computing device in the example of FIG. 3, in other examples, functional units may be executed on a centralized or distributed network of computing devices.

As shown in the example of FIG. 3, computing system 300 includes one or more processors 302, one or more interfaces 304, and one or more memory units 306. Computing system 300 also includes authentication module 310 and security token 320, which may be implemented as program instructions and/or data stored in memory units 306 and executable by processors 302 or implemented as one or more hardware units or devices of computing device 300. Memory units 306 of computing system 300 may also store an operating system (not shown) executable by processors 302 to control the operation of components of computing system 300 as well as user credentials 350 and virtual computer applications 352. The components, units or modules of computing system 300 are coupled (physically, communicatively, and/or operatively) using communication channels for inter-component communications. In some examples, the communication channels may include a system bus, a network connection, an inter-process communication data structure, or any other method for communicating data.

Processors 302, in one example, may comprise one or more processors that are configured to implement functionality and/or process instructions for execution within computing system 300. For example, processors 302 may be capable of processing instructions stored by memory units 306. Processors 302 may include, for example, microprocessors, digital signal processors (DSPs), application specific integrated circuits (ASICs), field-programmable gate array (FPGAs), or equivalent discrete or integrated logic circuitry, or a combination of any of the foregoing devices or circuitry.

Memory units 306 may be configured to store information within computing device 30 during operation. Memory units 306 may include a computer-readable storage medium or computer-readable storage device. In some examples, memory units 306 include one or more of a short-term memory or a long-term memory. Memory units 36 may include, for example, random access memories (RAM), dynamic random access memories (DRAM), static random access memories (SRAM), magnetic discs, optical discs, flash memories, or forms of electrically programmable memories (EPROM) or electrically erasable and programmable memories (EEPROM). In some examples, memory units 306 are used to store program instructions for execution by processors 302. Memory units 306 may be used by software or applications running on computing system 300 (e.g., authentication module 310) to temporarily store information during program execution.

For example, memory units 306 may store user credentials 350, which may be a database of user credentials for accessing internal network 108. For example, memory units 306 may include databases of usernames, passwords, biometric information, and the such, which may be encrypted. Memory units 306 may also store one or more virtual computer applications 352, which may be one or more versions of virtual computer applications for one or more computing platforms deployed by an organization associated with internal network 108 to computing devices (e.g., computing device 102) deployed by the organization or used by users associated with the organization.

Computing device 110 may utilize interfaces 304 to communicate with external devices, such as computing device 102 via one or more networks. Interfaces 304 may be network interfaces, such as Ethernet interfaces, optical transceivers, radio frequency (RF) transceivers, or any other type of devices that can send and receive information. Other examples of such network interfaces may include Wi-Fi or Bluetooth radios. In some examples, computing system 300 utilizes interfaces 304 to wirelessly communicate with external devices. For example, interfaces 304 may include WiFi radio 308 and cellular radio 311, so what computing system 300 may connect to and communicate with external computing devices over WiFi using WiFi radio 308 and may also connect to and communicate with external computing devices by connecting to a cellular data network (e.g., a 5G network) using cellular radio 311.

According to the disclosed techniques, processors 302 may execute authentication module 310 to authenticate users and computing devices to determine whether to grant the users and computing devices access to resources in internal network 108. Computing system 300 may receive, via interfaces 304, a request from a user of computing device 102 to access a resource in internal network 108 and authentication module 310 may determine, based on the request whether to grant access to internal network 108 to the user of computing device 102.

In some examples, computing system 300 may receive a request to access a resource in internal network 108, where the request may include an encrypted hash value and additional information, such as a timestamp, a username, and the like. Authentication module 310 may in response to receiving the encrypted hash value and the additional information, decrypt the encrypted hash value to generate a decrypted hash value and validate the decrypted hash value. For example, if the hash value is encrypted using a public key, authentication module 310 may decrypt the encrypted hash value using a private key that corresponds to the public key used to encrypt the hash value. If computing system 300 receives a plurality of encrypted hash values, such as an encrypted hash value resulting from hashing the user credentials, an encrypted hash value resulting from hashing the security code generated by a security token, and an encrypted hash value resulting from hashing at least a portion of the program code of virtual computer application 110 executing on computing device 102, authentication module 310 may decrypt each of the plurality of encrypted hash values.

To validate the hash value sent by virtual computing device 102, authentication module 310 may calculate a valid hash value and compare the valid hash value with the decrypted hash value received from computing device 102. If the valid hash value calculated by authentication module 310 matches (e.g., is identical to) the decrypted hash value, then authentication module 310 may determine that the decrypted hash value is valid.

To calculate a valid hash value that is to be compared with the decrypted hash value, authentication module 310 may determine the user credentials of the user that is using computing device 102 to access internal network 108, the security code associated with the timestamp at which computing device 102 generated the security code, and the portion of the program code of a virtual computer application that corresponds to the portion of the program code of virtual computer application 110 that was hashed by computing device 102. To determine the user credentials of the user that is using computing device 102 to access internal network 108, authentication module 310 may use the username included in the request to look up, in user credentials 350, the user credential of an authorized user of internal network 108 having the specified username.

In some examples, to determine the security code, authentication module 310 may use security token 320 to generate a security code based on the timestamp associated with the security code generated by computing device 102. Security token 320 may be a hardware token, such as a hardware device operably coupled to computing system 300 or a hardware component of computing system 300, or a software token, such as software that executes on computing system 300, that may generate a security code based on a seed, which may be different for each security token, and which may be encoded in the security token, and a timestamp. Because authentication module 310 may have access or may otherwise be able to determine the random seed used by the security token at computing device 102 to generate a security code, authentication module 310 may be able to use security token 320 to generate a security code based on the timestamp associated with the security code generated by computing device 102 and the same random seed used by the security token at computing device 102 to generate a security code.

To determine the portion of the program code of a virtual computer application that corresponds to the portion of the program code of virtual computer application 110 that was hashed by computing device 102, authentication module 310 may determine the version of virtual computer application 110 installed at computing device 102 and may retrieve, from one or more virtual computer applications 352, the program code of the same version and type of virtual computer application 110 installed at computing device 102. Authentication module 310 may therefore, for example, use the location of computing device 102 or the timestamp, as received as part of the additional information included in the request received from computing device 102, to determine the portion of the program code of the virtual computer application retrieved from one or more virtual computer applications 352 that corresponds to virtual computer application 110 installed at computing device 102.

Authentication module 310 may therefore hash the user credentials of the user that is using computing device 102 to access internal network 108, the security code generated by security token 320 based on the timestamp associated with the security code generated by computing device 102, and the portion of the program code of the virtual computer application retrieved from one or more virtual computer applications 352 that correspond to virtual computer application 110 to generate a valid hash value.

In some examples, authentication module 310 may generate separate valid hash values associated with the user credentials of the user that is using computing device 102 to access internal network 108, the security code generated based on the timestamp associated with the security code generated by computing device 102, and the portion of the program code of the virtual computer application. To that end, authentication module 310 may hash the user credentials of the user that is using computing device 102 to access internal network 108 to generate a valid hash value, hash the security code generated based on the timestamp associated with the security code generated by computing device 102 to generate a valid hash value, and hash the portion of the program code of the virtual computer application to generate a valid hash value.

Authentication module 310 may compare the generated valid hash value with the decrypted hash value from computing device 102 to determine if the one or more hash values calculated by authentication module 310 are identical to the one or more decrypted hash value. If each of the one or more hash valid values calculated by authentication module 310 match (e.g. are identical to) the one or more decrypted hash value from computing device 102, authentication module 310 may determine that the hash value generated by computing device 102 is valid.

As such, if the decrypted hash value is a hash value generated by hashing together the user credentials of the user that is using computing device 102 to access internal network 108, the security code associated with the timestamp at which computing device 102 generated the security code, and the portion of the program code of virtual computer application 110, authentication module 310 may compare the decrypted hash value with the valid hash value generated by authentication module 310 hashing together the user credentials of the user that is using computing device 102 to access internal network 108, the security code associated with the timestamp at which computing device 102 generated the security code, and the portion of the portion of the program code of a virtual computer application that corresponds to the portion of the program code of virtual computer application 110 that was hashed by computing device 102.

On the other hand, if the decrypted hash value includes a hash value generated by hashing the user credentials of the user, a hash value generated by hashing the security code, and a hash value generated by hashing the portion of the program code of the virtual computer application 110, authentication module 310 may compare the hash value generated by hashing the user credentials of the user with the valid hash value generated by authentication module 310 hashing the user credentials of the user, compare the hash value generated by hashing the security code with the valid hash value generated by authentication module 310 hashing the security code, and compare the hash value generated by hashing the portion of the program code of the virtual computer application 110 with the valid hash value generated by authentication module 310 hashing the portion of the program code of the virtual computer application.

Authentication module 310 may, in response to determining that the hash value generated by computing device 102 and sent in encrypted form to management server system 104 or edge computing system 106 is valid, perform multi-factor authentication of computing device 102 by sending an indication of a passcode to computing device 102 via a communications channel different from the communication channel that transmitted the encrypted hash value to computing system 300. That is, if computing system received the indication of the encrypted hash value from computing device 102 via a network interface, such as via WiFi radio 308, computing system 300 may send the passcode to computing device 102 via a different network interface, such as via cellular radio 311. In some examples, authentication module 310 may encrypt the passcode and send an indication of the encrypted passcode to computing device 102. For example, authentication module 310 may encrypt the passcode using a cryptographic key, such as a public key to encrypt the passcode.

In response to sending the indication of the encrypted passcode to computing device 102, computing system 300 may wait for computing system 102 to send an indication of the passcode back to computing system 300. Computing system 300 may receive an indication of the passcode from computing device 102 and authentication module 310 may, in response, validate the passcode received from computing device 102 by determining whether the passcode received from computing device 102 matches the passcode sent from computing system 300 to computing device 102. For example, authentication module 310 may determine whether the passcode received from computing device 102 matches the passcode sent from computing system 300 to computing device 102 by determining whether the value of the passcode received from computing device 102 is the same as the value of the passcode sent computing system 300 to computing device 102.

If authentication module 310 determines that the passcode received from computing device 102 matches the passcode sent from computing system 300 to computing device 102, authentication module 310 may grant computing device 102 access to resources in internal network 108. For example, computing system 300 may send to computing device 102 an indication that virtual computing application 110 is authorized to access resources in internal network 108. When computing system 300 receives subsequent requests and/or commands from computing device 102 to access resources in internal network 108, computing system 300 may grant computing device 102 access to such resources based on computing device 102 being authorized to access internal network 108.

Figure 4:
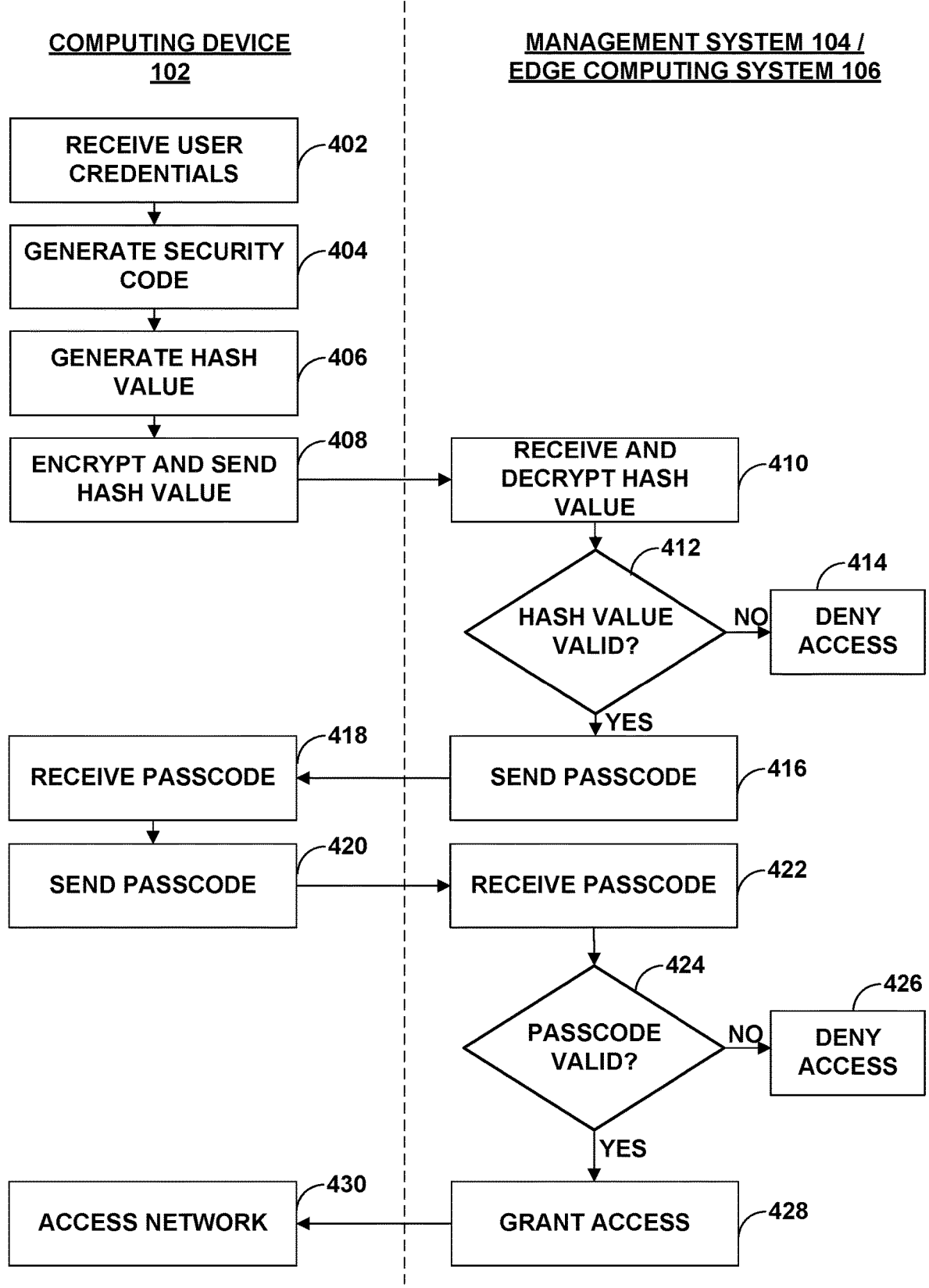
FIG. 4 is a flowchart illustrating an example computing device that communicates with an example management system or an example edge computing system to authenticate the example computing device to access an example internal network, in accordance with the techniques of this disclosure.

FIG. 4 is a flowchart illustrating computing device 102 that communicates with management system 104 or edge computing system 106 to authenticate computing device 102 to access internal network 108, in accordance with the techniques of this disclosure.

As shown in FIG. 4, computing device 102 may receive user credentials of a user that is using computing device 102 to attempt to access internal network 108 (402). Computing device 102 may also use a security token to generate a security code (404). Computing device 102 may therefore generate hash value by hashing the user credentials, the security code, and at least a portion of the program code of virtual computer application 110 (406). In some examples, rather than generating a single hash value, computing device 102 may generate separate hash values, including generating a hash value by hashing the user credentials, generating a hash value by hashing the security code, and generating a hash value by hashing at least a portion of the program code of virtual computer application 110.

Computing device 102 may encrypt the hash value or hash values and send the hash value or hash values to management system 104 or edge computing system 106 (408). Management system 104 or edge computing system 106 may receive the encrypted hash value or hash values from computing device 102 and may decrypt the hash value or hash values (410). Management system 104 or edge computing system 106 may validate the decrypted hash value or hash values to determine whether the decrypted hash value is valid (412).

To validate the decrypted hash value or hash values, management system 104 or edge computing system 106 may generate a valid hash value based on hashing the known user credentials of an authorized user of internal network 108, a security code generated using the same seed and timestamp as the security code generated and hashed by computing device 102, and the same portion of a virtual computer application as the portion of virtual computer application 110 hashed by computing device 102, and may compare the generated hash value with the decrypted hash value. If the decrypted hash value does not match the generated hash value (NO branch of 412), management system 104 or edge computing system 106 may deny computing device 102 access to internal network 108 (414).

In some examples, if computing device 102 generates and sends individual hash values, management system 104 or edge computing system 106 may generate a valid hash value by hashing the user credentials of the authorized user of internal network 108, generate a valid hash value by hashing the security code generated using the same seed and timestamp as the security code generated and hashed by computing device 102, and generate a valid hash value by hashing the same portion of a virtual computer application as the portion of virtual computer application 110 hashed by computing device 102. Management system 104 or edge computing system 106 may therefore determine whether the decrypted hash value generated by hashing the user credentials match the valid hash value generated by hashing the user credentials of the authorized user of internal network 108, determine whether the decrypted hash value generated by hashing the security code matches the valid hash value generated by hashing the security code, and determine whether the decrypted hash value generated by hashing at least a portion of the program code of virtual computer application 110 matches the valid hash value generated by hashing the same portion of a virtual computer application as the portion of virtual computer application 110 hashed by computing device 102.

If the decrypted hash value matches the generated valid hash value or if the set of decrypted hash values matches the set of generated valid hash values (YES branch of 412), management system 104 or edge computing system 106 may perform two-factor authentication by generating and sending a passcode to computing device 102 (416). Management system 104 or edge computing system 106 may send the passcode via a communications channel that is different from the communications channel used by computing device 102 to send the encrypted hash code to management system 104 or edge computing system 106.

Computing device 102 may receive the passcode from management system 104 or edge computing system 106 (418) and may, in response, send the received passcode back to management system 104 or edge computing system 106 (420) without user intervention. Management system 104 or edge computing system 106 may receive the passcode from computing device 102 (422) and may determine whether the passcode received from computing device 102 is valid (424).

Management system 104 or edge computing system 106 may determine whether the passcode received from computing device 102 is valid by determining whether the passcode received from computing device 102 is the same as the passcode sent by management system 104 or edge computing system 106 to computing device 102. If the passcode received from computing device 102 is the same as the passcode sent by management system 104 or edge computing system 106 to computing device 102, management system 104 or edge computing system 106 may determine that the passcode received from computing device 102 is valid.

If management system 104 or edge computing system 106 determines that the passcode received from computing device is not valid (NO branch of 424), management system 104 or edge computing system 106 may deny computing device 102 access to internal network 108 (426). If management system 104 or edge computing system 106 determines that the passcode received from computing device is valid (YES branch of 424), management system 104 or edge computing system 106 may grant computing device 102 access to internal network 108 (428). Computing device 102 may therefore gain access to internal network 108 (430).

Figure 5:
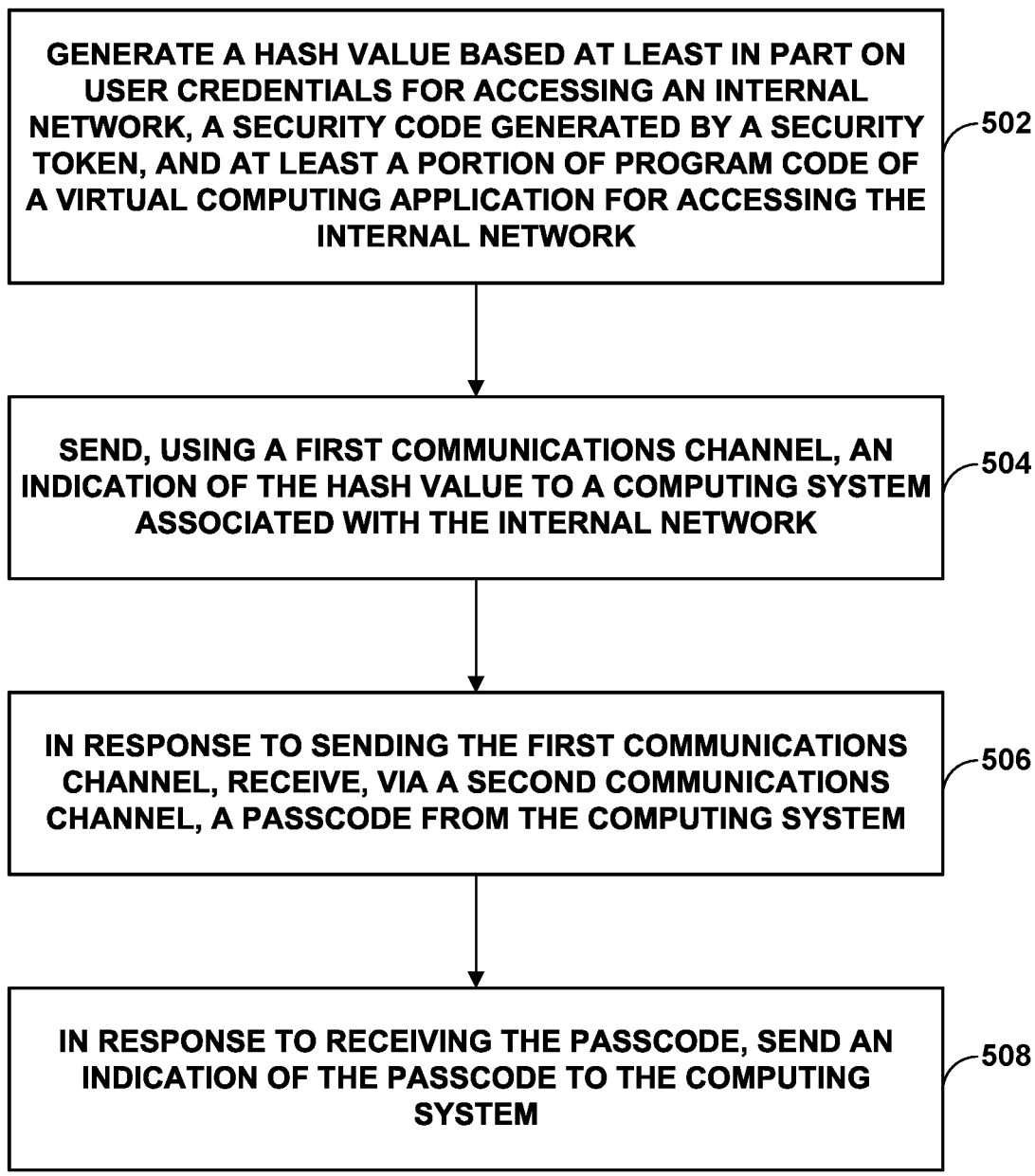
FIG. 5 is a flowchart illustrating operations of a computing device to authenticate with an internal network to gain access to the internal network.

FIG. 5 is a flowchart illustrating operations of a computing device to authenticate with an internal network to gain access to the internal network. FIG. 5 is described with respect to computing device 102 of FIG. 1.

As shown in FIG. 5, computing device 102 may generate a hash value based at least in part on user credentials for accessing an internal network, a security code generated by a security token, and at least a portion of program code of a virtual computing application 110 for accessing the internal network 108 (502). Computing device 102 may send, using a first communications channel (e.g., communications channel 114A or communications channel 116A), an indication of the hash value to a computing system (e.g., management system 104 or edge computing system 106) associated with the internal network 108 (504). Computing device 102 may, in response to sending hash value, receive, via a second communications channel (e.g., communications channel 114B or communications channel 116B), a passcode from the computing system (e.g., management system 104 or edge computing system 106) (506). Computing device 102 may, in response to receiving the passcode, send an indication of the passcode to the computing system (e.g., management system 104 or edge computing system 106) (508).

In some examples, to generate the hash value, computing device 102 may hash the user credentials, the security code, and the portion of the program code to generate the hash value. In some examples, to generate the hash value, computing device 102 may hash the user credentials to generate a first hash value, hash the security code to generate a second hash value, and hash the portion of the program code to generate a third hash value, where the hash value comprises the first hash value, the second hash value, and the third hash value. In some examples, computing device 102 may select the portion of the program code of the virtual computing application to be used to generate the hash value based at least in part on a location of the computing device 102 or a time. In some examples, to generate the hash value, computing device 102 may further encrypt the hash value to generate an encrypted hash value.

In some examples, the first communications channel comprises the Internet and the second communications channel comprises a cellular network. In some examples, the first communications channel comprises a first wireless connection established by a first one or more radios of the computing device 102 and the second communications channel comprises a second wireless connection established by a second one or more radios of the computing device 102.

Figure 6:
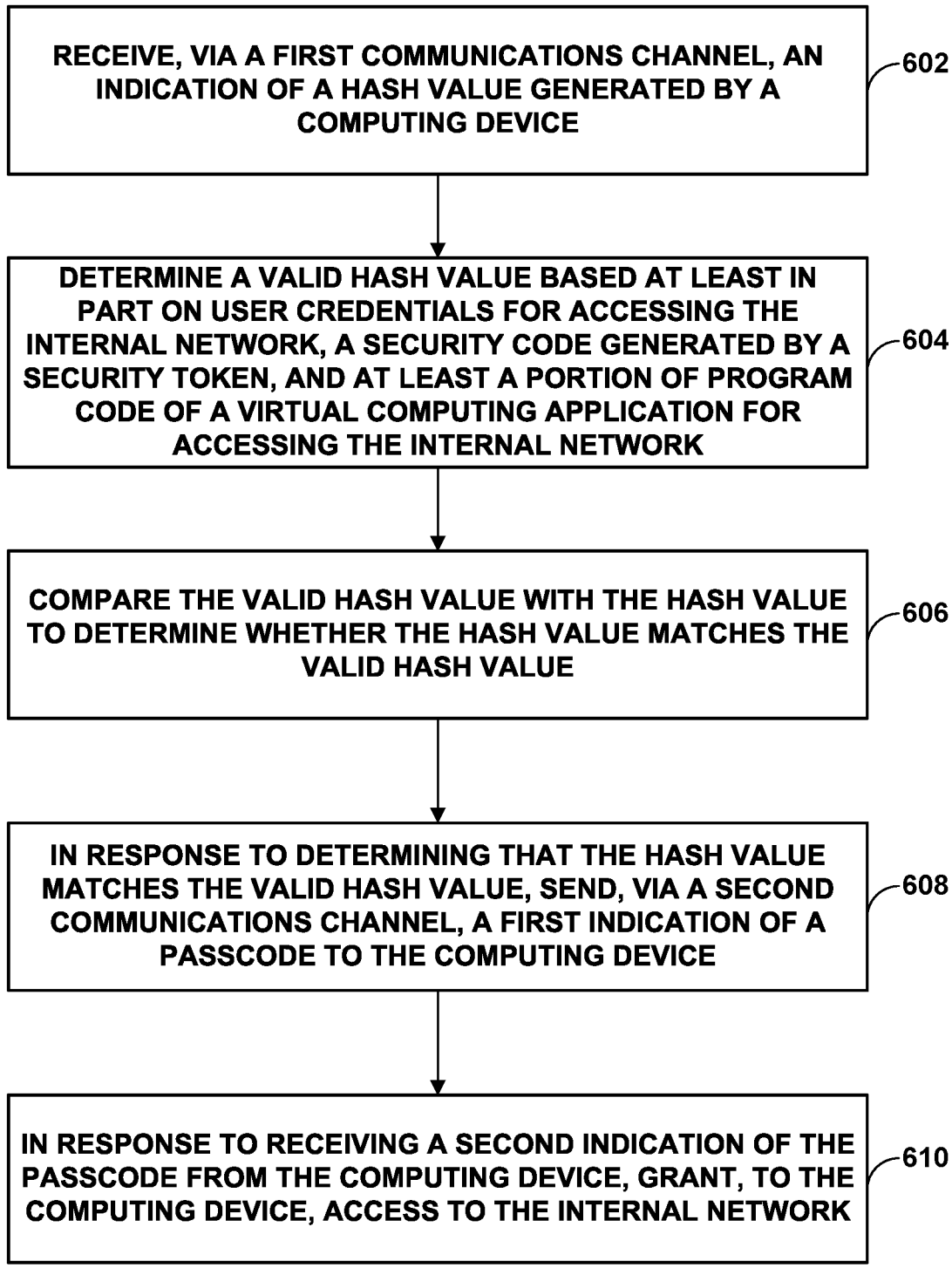
FIG. 6 is a flowchart illustrating operations of a computing system to authenticate a computing device to determine whether to grant the computing device access to an internal network.

FIG. 6 is a flowchart illustrating operations of a computing system to authenticate a computing device to determine whether to grant the computing device access to an internal network. FIG. 6 is described with respect to management system 104 and/or edge computing system 106 of FIG. 1.

As shown in FIG. 6, management system 104 and/or edge computing system 106 associated with internal network 108 may receive, via a first communications channel (e.g., communications channel 114A or communications channel 116A), an indication of a hash value generated by a computing device 102 (602). Management system 104 and/or edge computing system 106 may determine a valid hash value based at least in part on user credentials for accessing the internal network, a security code generated by a security token, and at least a portion of program code of a virtual computing application for accessing the internal network (604). Management system 104 and/or edge computing system 106 may compare the valid hash value with the hash value to determine whether the hash value matches the valid hash value (606). Management system 104 and/or edge computing system 106 may, in response to determining that the hash value matches the valid hash value, send, a second communications channel (e.g., communications channel 114B or communications channel 116B), a first indication of a passcode to the computing device 102 (608). Management system 104 and/or edge computing system 106 may, in response to receiving a second indication of the passcode from the computing device 102, grant, to computing device 102, access to the internal network 108 (610).

In some examples, to generate the valid hash value, management system 104 and/or edge computing system 106 may hash the user credentials, the security code, and the portion of the program code to generate the hash value. In some examples, to generate the valid hash value, management system 104 and/or edge computing system 106 may hash the user credentials to generate a first valid hash value, hash the security code to generate a second valid hash value, and hash the portion of the program code to generate a third valid hash value, where the valid hash value comprises the first valid hash value, the second valid hash value, and the third valid hash value.

In some examples, to receive the indication of the hash value, management system 104 and/or edge computing system 106 may indications of a first hash value, a second hash value, and a third hash value. To compare the valid hash value with the hash value to determine whether the hash value matches the valid hash, management system 104 and/or edge computing system 106 may compare the first hash value with the first valid hash value, compare the second hash value with the second value hash value, and compare the third hash value with the third valid hash value to determine whether the first hash value matches the first valid hash value, whether the second hash value matches the second valid hash value, and whether the third hash value.

To, in response to determining that the hash value matches the valid hash value, send the first indication of a passcode to the computing device 102, management system 104 and/or edge computing system 106 may, in response to determining that the first hash value matches the first valid hash value, the second hash value matches the second valid hash value, and the third hash value matches the third valid hash value, send, via the second communications channel, the first indication of the passcode to the computing device 102.

In some examples, management system 104 and/or edge computing system 106 may select the portion of the program code of the virtual computing application to be used to generate the valid hash value based at least in part on a location of the computing device 102 or a time.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over a computer-readable medium as one or more instructions or code, and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry, as well as any combination of such components. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
    generating, by a virtual computing application executing at a computing device for accessing an internal network, a hash value based at least in part on user credentials for accessing the internal network, a security code generated by a security token, and at least a portion of program code of the virtual computing application, wherein the portion of the program code of the virtual computing application includes executable code of the virtual computing application;
    sending, by the computing device and using a first communications channel, an indication of the hash value to a computing system associated with the internal network;
    in response to sending the hash value, receiving, by the computing device and via a second communications channel, a first indication of a passcode from the computing system;
    in response to receiving the passcode, sending, by the computing device, a second indication of the passcode to the computing system; and
    in response to the computing system successfully validating the passcode sent by the computing device, accessing, by the virtual computing application, the internal network.

2. The method of claim 1, wherein generating the hash value comprises hashing, by the computing device, the user credentials, the security code, and the portion of the program code to generate the hash value.

3. The method of claim 1, wherein generating the hash value comprises:
    hashing, by the computing device, the user credentials to generate a first hash value;
    hashing, by the computing device, the security code to generate a second hash value; and
    hashing, by the computing device, the portion of the program code to generate a third hash value; and
    wherein the hash value comprises the first hash value, the second hash value, and the third hash value.

4. The method of claim 1, further comprising:
    selecting, by the computing device, the portion of the program code of the virtual computing application to be used to generate the hash value based at least in part on a location of the computing device or a time.

5. The method of claim 1, wherein the first communications channel comprises the Internet and the second communications channel comprises a cellular network.

6. The method of claim 1, wherein the first communications channel comprises a first wireless connection established by a first one or more radios of the computing device and the second communications channel comprises a second wireless connection established by a second one or more radios of the computing device.

7. The method of claim 1, wherein generating the hash value further comprises encrypting, by the computing device, the hash value to generate an encrypted hash value.

8. A computing device comprising:
    memory; and
    one or more processors in communication with the memory and configured to:
        generate, by a virtual computing application executing at the computing device for accessing an internal network, a hash value based at least in part on user credentials for accessing the internal network, a security code generated by a security token, and at least a portion of program code of the virtual computing application, wherein the portion of the program code of the virtual computing application includes executable code of the virtual computing application;
        send, using a first communications channel, an indication of the hash value to a computing system associated with the internal network;
        in response to sending the hash value, receive, via a second communications channel, a first indication of a passcode from the computing system;
        in response to receiving the passcode, send a second indication of the passcode to the computing system; and
        in response to the computing system successfully validating the passcode sent by the computing device, access, by the virtual computing application, the internal network.

9. The computing device of claim 8, wherein to generate the hash value, the one or more processors are further configured to hash the user credentials, the security code, and the portion of the program code to generate the hash value.

10. The computing device of claim 8, wherein to generate the hash value, the one or more processors are further configured to:
    hash the user credentials to generate a first hash value;
    hash the security code to generate a second hash value; and
    hash the portion of the program code to generate a third hash value; and
    wherein the hash value comprises the first hash value, the second hash value, and the third hash value.

11. The computing device of claim 8, wherein the one or more processors are further configured to:
    select the portion of the program code of the virtual computing application to be used to generate the hash value based at least in part on a location of the computing device or a time.

12. The computing device of claim 8, wherein the first communications channel comprises the Internet and the second communications channel comprises a cellular network.

13. The computing device of claim 8, wherein the first communications channel comprises a first wireless connection established by a first one or more radios of the computing device and the second communications channel comprises a second wireless connection established by a second one or more radios of the computing device.

14. The computing device of claim 8, wherein to generate the hash value, the one or more processors are further configured to encrypt the hash value to generate an encrypted hash value.

15. A non-transitory computer-readable storage medium storing instructions that, when executed, cause one or more processors of a computing device to:
   generate, by a virtual computing application executing at the computing device for accessing an internal network, a hash value based at least in part on user credentials for accessing the internal network, a security code generated by a security token, and at least a portion of program code of the virtual computing application, wherein the portion of the program code of the virtual computing application includes executable code of the virtual computing application;
   send, using a first communications channel, an indication of the hash value to a computing system associated with the internal network;
   in response to sending the hash value, receive, via a second communications channel, a first indication of a passcode from the computing system;
   in response to receiving the passcode, send a second indication of the passcode to the computing system; and
   in response to the computing system determining that the passcode sent by the computing device is valid, access, by the virtual computing application, the internal network.

16. A method comprising:
   receiving, by a computing system associated with an internal network via a first communications channel, an indication of a hash value generated by a virtual computing application executing at a computing device for accessing the internal network;
   determining, by the computing system, a valid hash value based at least in part on user credentials for accessing the internal network, a security code generated by a security token, and at least a portion of program code of the virtual computing application, wherein the portion of the program code of the virtual computing application includes executable code of the virtual computing application;
   comparing, by the computing system, the valid hash value with the hash value to determine whether the hash value matches the valid hash value;
   in response to determining that the hash value matches the valid hash value, sending, by the computing system via a second communications channel, a first indication of a passcode to the computing device; and
   in response to receiving a second indication of the passcode from the computing device, granting, by the computing system to the virtual computing application executing at the computing device, access to the internal network.

17. The method of claim 16, wherein generating the valid hash value comprises hashing, by the computing system, the user credentials, the security code, and the portion of the program code to generate the hash value.

18. The method of claim 16, wherein generating the valid hash value further comprises:
   hashing, by the computing system, the user credentials to generate a first valid hash value;
   hashing, by the computing system, the security code to generate a second valid hash value; and
   hashing, by the computing system, the portion of the program code to generate a third valid hash value; and
   wherein the valid hash value comprises the first valid hash value, the second valid hash value, and the third valid hash value.

19. The method of claim 18, wherein:
   receiving the indication of the hash value further comprises receiving, by the computing system, indications of a first hash value, a second hash value, and a third hash value;
   comparing the valid hash value with the hash value to determine whether the hash value matches the valid hash value further comprises comparing, by the computing system, the first hash value with the first valid hash value, the second hash value with the second valid hash value, and the third hash value with the third valid hash value to determine whether the first hash value matches the first valid hash value, whether the second hash value matches the second valid hash value, and whether the third hash value matches the third valid hash value; and
   in response to determining that the hash value matches the valid hash value, sending, the first indication of a passcode to the computing device further comprises in response to determining that the first hash value matches the first valid hash value, the second hash value matches the second valid hash value, and the third hash value matches the third valid hash value, sending, by the computing system via the second communications channel, the first indication of the passcode to the computing device.

20. The method of claim 16, further comprising:
   selecting, by the computing system, the portion of the program code of the virtual computing application to be used to generate the valid hash value based at least in part on a location of the computing device or a time.

* * * * *